United States Patent Office 3,179,341
Patented Apr. 20, 1965

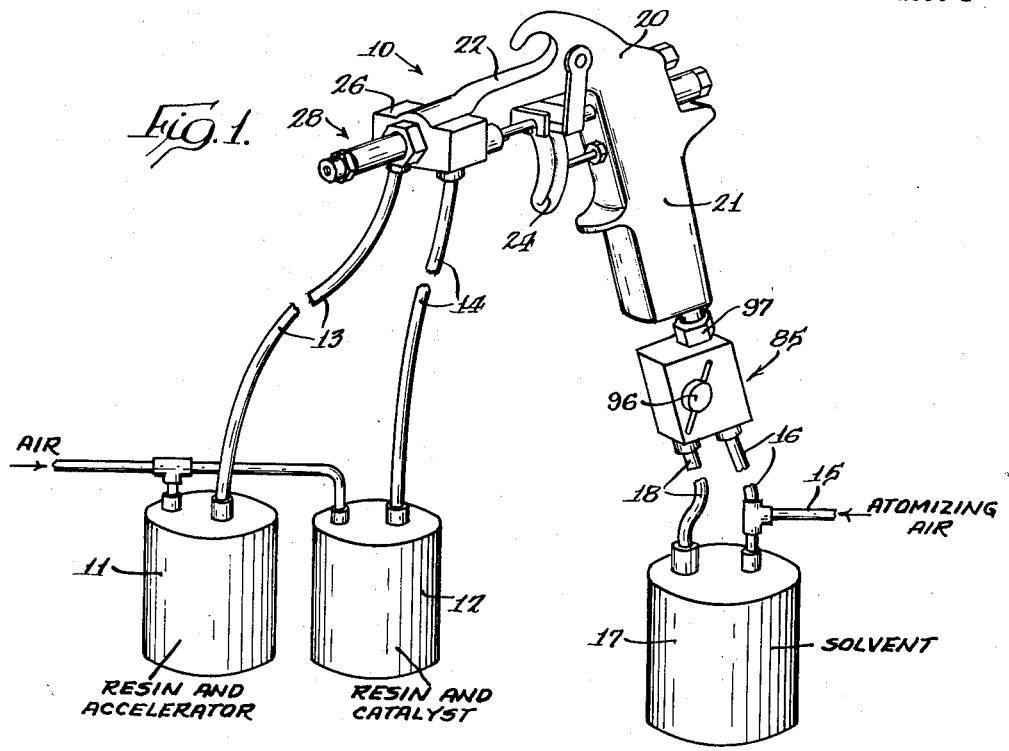
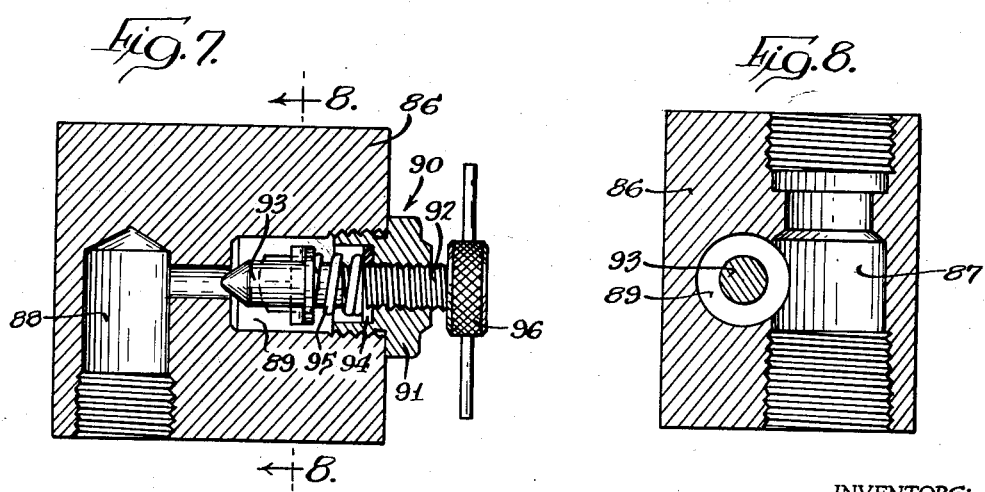

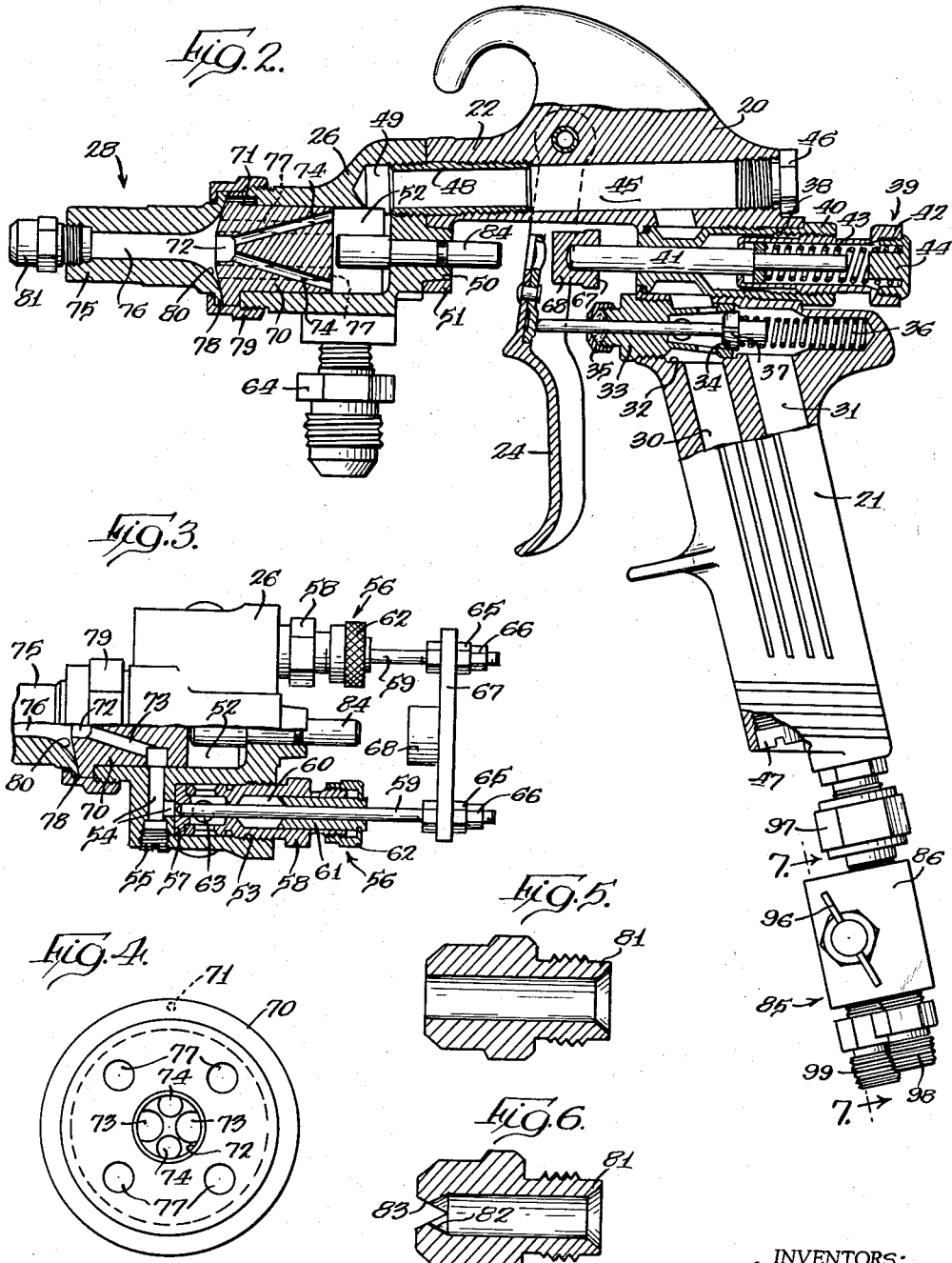

3,179,341
SPRAY GUN
Otto G. Plos, Berwyn, and Walter M. Jones, Evanston, Ill., assignors to Binks Manufacturing Company, Chicago, Ill., a corporation of Delaware
Filed June 19, 1962, Ser. No. 203,578
12 Claims. (Cl. 239—414)

The present invention relates to apparatus for spraying coating materials, and particularly, to means for spraying plural fluid component coating materials such as urethane foams, epoxies, polyesters, gel coats and other rapidly reacting chemical materials.

The art is replete with suggestions for the supply and spray application of various materials, generally termed plastics, comprised of relatively rapidly reacting chemical components. The components are known generically as resin, accelerator and catalyst. Individually, they are substantially stable, but when mixed in proper proportions, they react quite quickly to form the completed product and to take at least a firm set, i.e., to commence solidifying. Consequenly, it is not feasible to mix the components in a tank for spray application by a conventional paint spray gun, since the material would solidify in the tank before it could be sprayed.

Mixtures of resin and accelerator are fairly stable and are said to have a long "pot life," i.e., to remain fluid for a long time after mixing. Resin and catalyst produce a reaction when combined, but most such mixtures have a pot life of several hours duration, i.e., the reaction is sufficiently slow that the mixture remains flowable for several hours after mixing. In view of this, the art has previously proposed that two material batches be prepared, one comprised of about one-half of the resin and all of the accelerator and the other comprised of the remainder of the resin and all of the catalyst, and that these two batches be supplied respectively to a pair of spray nozzles disposed to provide intersecting spray patterns, whereby the two material batches would be sprayed individually, be intermixed in spray form exteriorly of the apparatus and be applied as a unitary spray of the complete mixture on a surface to be coated. A two-headed spray gun affording the defined spray relationship is shown in Patent 2,462,262 to Gustafsson et al.; and a three-headed gun providing three convergent sprays is shown in Patent 2,458,220 to Striegel et al. These guns and the described spraying system afford the advantage that the rapidly reactant components are supplied and sprayed separately of one another and are mixed only to the exterior of the apparatus whereby spray application of the material is facilitated and the danger of reactant components setting up within and blocking the apparatus or rendering it inoperative is mitigated.

An improved spraying system and gun (which is disclosed by Patents 2,739,843 to Baur and 2,829,006 to Johansson) comprises an arrangement wherein resin and accelerator are supplied to a primary spray nozzle and catalyst alone is supplied to a secondary nozzle disposed to one side and forwardly of the primary nozzle and extending transversely thereof, whereby a spray or stream of catalyst may be added in proper proportion to the resin and accelerator exteriorly of the gun and the remainder of the apparatus, thereby to attain the same advantages as the first described system. In addition, the improved system eliminates the necessity for premixing resin and catalyst and the attendant disadvantages of short pot life and the inherent problem of setting of the mixture; results in a smaller, lighter, more readily manipulated gun; and facilitates use of less expensive component supply means since the catalyst supply means may be smaller and lighter than supply means for a mixture of resin and catalyst.

While the above described spray guns perform efficiently and effectively for certain plural fluid component materials, and particularly for certain materials respectively, they suffer two especially notable shortcomings. First, they are not effective for the spraying of foaming resins, such as urethane foams, since these require an extremely thorough mixture of the components not generally attainable by the simple convergence of two or more spray patterns. Second, the necessity for multiple spray heads or nozzles renders the guns complex, expensive and bulky.

Relative to the first stated shortcoming, the art has proposed guns for spraying foaming resins and other plural component materials, an example of which is disclosed in Patent 2,970,773 to Keryluk et al. Generally, these guns comprise a mixing chamber, a motor driven mechanical mixer in the chamber, a pair of inlets to the chamber for separate supply thereto of mixtures of resin and catalyst and resin and accelerator, and a spray nozzle at the outlet of the chamber. By virture of the mixing chamber and the mechanical mixer, such guns assure thorough mixture of the components and discharge in a controllable spray pattern of a material that is foamed or foaming as it leaves the gun and that strikes the surface to be coated in the form of a foam. However, these guns are exceedingly expensive because of the mixer and the motor drive therefor; considerable difficulty has been encountered because of the highly corrosive materials leaking along the mixer shaft and into the motor, and because of the materials coagulating in the mixer; and the guns have been difficult to maintain and keep clean.

The object of the present invention is to provide improved means for spraying plural fluid component materials having a broader range of application than, and overcoming the disadvantages of, the prior art spray guns.

It is particularly an object of this invention to provide an improved spray gun of economical construction, relatively lightweight and sleek design having only a single spray head and requiring no mechanical mixer or motor, and yet efficiently and effectively spraying a broad range of plural fluid component materials of both foaming and nonfoaming types.

One specific object of the invention is to provide improved nozzle means for plural component spray guns comprising a body having a plurality of separate spaced passages therein which converge into a mixing chamber to discharge streams of fluid therein in diagonally intersecting relation, the passages including a passage for each component and a passage for air under pressure whereby the components are intermingled and are thoroughly admixed by the air.

A second object of the invention is the provision of improved nozzle means as aforesaid including supplemental air passages opening into the mixing chamber in circumscribing relation to the convergent ends of the first-named passages whereby to assist in the admixing of the components and to scour the walls of the mixing chamber.

Another object is to include in the improved nozzle means described a mixing chamber aligned at one end with the convergent ends of the first-named passages and having a transverse dimension through the major portion of its length less than the diameter of the circumscribing circle defined by said supplemental air passages, the chamber being flared or belled-out at said one end for communication with the supplemental air passages and for directing air therefrom diagonally through the streams emitting from the first-named passages and along the walls of the chamber thereby to enhance the admixing and scouring functions of the supplemental air, and especially to insure thorough admixture of the components of foaming resins.

An additional object of the invention is to complete the described nozzle means, without necessity for mechanical mixers, plural nozzles, or the like, by merely attaching to the mixing chamber a simplified spray nozzle for causing the mixture to be atomized and discharged from the nozzle in a selected spray pattern.

It is also an object of the invention to embody said nozzle means in a compact, economical and readily maintained physical assembly consisting merely of a small compact, cylindrical mixing nozzle, a cylindrical mixing chamber having a radially flanged portion at one end thereof to be abutted against the mixing nozzle, a mounting ring cooperating with said flanged portion for securing the mixing nozzle and chamber to a gun, and a spray nozzle threaded into the other end of the chamber.

A further object of the invention is the provision of means for clearing the nozzle means of mixed and reacting components whenever operation of the gun is discontinued, whether the discontinuance be momentary or for a prolonged period, thereby to keep the gun clean and prevent setting of mixed material in the gun.

Specifically, it is an object of the invention to provide an improved gun including means for starting and stopping the supply of components and air to the gun, and bleed means in the air supply for accommodating a continuous flow of air into said nozzle means through the above defined passages thereby to clear the mixing chamber and nozzle of mixed components, and specifically to clear everything except the component supply passages.

Another facet of this aspect of the invention is the provision of solvent supply means rendered operative upon stopping of the supply of components and air, and valved controlled means for selectively supplying solvent to the air passages of the nozzle means to facilitate thorough cleansing of all but the component supply passages.

An additional facet is to couple the solvent supply with the air passage means to the pressure side of the bleed means, whereby the bleed means restricts the supply of solvent to the very slight amount required for adequate cleansing.

A further object of the present invention is the provision of an improved spray gun incorporating all of the above stated features in a compact, economical embodiment of rugged construction and long service life.

Other objects and advantages of the invention will become apparent in the following detailed description.

Now, in order to acquaint those skilled in the art with the manner of making and using our improved spray gun, we shall describe, in connection with the accompanying drawings, a preferred embodiment of our invention and the preferred manner of making and using the same.

In the drawing:

FIGURE 1 is a perspective view of the preferred embodiment of the gun of our invention showing the same associated with air, component and solvent supply means therefor;

FIGURE 2 is a side view, partly in longitudinal vertical section and partly in elevation, of the gun;

FIGURE 3 is a fragmentary top view, partly in section and partly in plan, of the nozzle and component supply portions of the gun;

FIGURE 4 is a front elevation, on an enlarged scale, of the mixing nozzle;

FIGURES 5 and 6 are longitudinal sections, also on an enlarged scale, of spray nozzles for the gun, the nozzles producing a round spray pattern and a fan pattern, respectively;

FIGURE 7 is a transverse vertical section of the solvent supply valve, the view being taken on an enlarged scale substantially on line 7—7 of FIGURE 2; and FIGURE 8 is a longitudinal vertical section of said valve taken substantially on line 8—8 of FIGURE 7.

Referring now to the drawings, and particularly to FIGURE 1, it will be appreciated that the gun of the present invention, whether it be a manually operated gun as indicated at 10, or an automatic gun, is adapted to be supplied with at least two components for making up the material to be sprayed. These components, depending upon their nature and the results to be achieved, and upon the construction and/or adjustment of the valves to be described hereinafter, may be supplied in either of the manners described hereinbefore or in any other manner known in the art. By way of example, we have shown the gun to be supplied from pressure tanks 11 and 12 with mixtures of resin and accelerator and resin and catalyst, respectively, the mixtures being conducted to the gun via flexible hoses 13 and 14, respectively. The gun is also supplied with air under pressure for mixing and atomizing purposes via a conduit 15 and a flexible hose 16. A solvent supply pressure tank 17 is associated with the conduit 15 and hose 16 for controlled supply of solvent to the gun via a flexible hose 18. As is conventional with manually operated guns, the components to be sprayed are conducted to a spray head adjacent the forward end of the gun and the air (and the solvent) are conducted to the handle of the gun.

The gun 10, as best shown in FIGURES 2 and 3, is comprised essentially of a body 20 having a handle 21 and a barrel portion 22, an operating trigger 24 pivoted on the body forwardly of the handle, a head 26 secured to the forward end of the barrel portion 22 and a nozzle means or assembly 28 associated with and secured to the head 26.

The body 20 of the gun preferably comprises a unitary casting having a pair of spaced parallel passages 30 and 31 in the handle portion thereof, the passage 30 adjacent the forward edge of the handle extending continuously through the handle and into the barrel portion of the gun and the other passage 31 extending only partially into the handle, specifically through that part of the handle comprising the hand grip portion thereof. At the upper end of the passage 31, the handle is provided with a cross bore 32 extending in the axial direction of the gun inwardly into the handle from the forward side thereof and intersecting both of the passages 30 and 31.

Mounted within the bore 32 is an air valve assembly including a combined valve seat and mounting member 33 comprising a plug portion threaded into the forward end of the bore 32, a laterally ported tubular intermediate portion and a valve seat portion engaging in the wall that separates the passages 30 and 31. Associated with the member 33 is a valve 34 having a body portion to the pressure side of the valve seat sealably engageable with the seat, and an elongate stem extending slidably through the tubular and body portions of the member 33 and forwardly of the handle. The stem is preferably sealed by a packing gland assembly 35 secured to the forward end of the body portion, and a compression spring 36 is confined between the bottom of the bore 32 and the body of the valve 34 normally to urge the valve into engagement with its seat. According to the present invention, a small bleed type of by-pass is provided around the valve, preferably by a slot 37 in the body of the valve.

A second cross bore 38 is provided in the handle of the body above the upper end of the passage 31 and immediately above and parallel to the cross bore 32. Mounted within this bore is a yoke biasing assembly 39 comprised of a tubular body portion 40 threaded into the bore from the rearward end thereof and sealed at its forward end in the handle, a yoke biasing stem 41 slidably mounted in the body 40 and projecting axially to the forward side of the handle above the stem of the valve 34, a cup-shaped retainer 42 adjustably mounted in the body 40 by means of cooperating screw threads and comprising means for limiting the forward movement of the stem and for maintaining an adjustable spring pressure on the stem, and a spring 43 confined within the retainer by an end cap 44 for maintaining a forwardly biasing force on the stem 41, the biasing force of the spring being adjustable by virtue of adjustment of the retainer 42 within the body 40. At the portion thereof aligned with the passage 30, the body 40 is of reduced diameter to accommodate flow of fluid thereby.

At the upper end of the passage 30, the barrel 22 of the gun body is provided with a generally longitudinally extending bore 45 which intersects the passage 30 and is closed at its rearward end by means of a plug 46. A similar plug 47 closes the passage 30 at its lower end.

In use of the gun, the passage 31 comprises the air inlet to the gun, whereby air under pressure is normally supplied to the rearward face of the valve 34, the pressure of the air assisting in maintaining the valve on its seat. When the valve is opened, upon depression of its stem by the trigger 24, the valve accommodates passage of air into the tubular portion of the member 33, through the lateral ports in the wall of said tubular portion into the passage 30, around the reduced portion of the body 40 of the yoke biasing assembly and into the bore 45 in the barrel 22. Upon release of the trigger 24, the spring 36 and air under pressure force the valve onto its seat thereby to discontinue high rate of air flow. In the closed position of the valve, the slot 37 accommodates a restricted flow of air past the valve into the passage 30, whereby at least some air is continuously supplied to the bore 45 in the gun barrel.

The spray head 26, which may suitably be a unitary casting, includes a central portion to be coupled to the forward end of the body barrel 22 in communication with the bore 45, and laterally enlarged portions to opposite sides of said central portion. The central portion of the head includes an upstanding portion to be aligned with and coupled to the barrel of the body by means of a tubular threaded fastener 48 conventionally employed in the art, the fastener including threaded end portions threadably engaged in the bore 45 and in an aligned bore 49 in the central portion of the head, the fastener being accessible through the bore 45 upon removal of the plug 46. In addition, the central portion of the head includes a rearwardly projecting conical stem or stud 50 entering into a complemental recess in a depending projection 51 on the body barrel 22, thereby to retain the head against inadvertent rotation relative to the body. The central portion of the head preferably projects axially forward from the stem or stud 50 and is provided in said projecting portion with an enlarged forwardly open, cylindrical chamber or bore 52 communicating with the bore 49, whereby said chamber or bore 52 may be supplied with air under pressure.

The laterally enlarged portions of the head 26 are substantially identical and mount substantially identical valve means, so that a description of one such portion and valve means will suffice. Referring to FIGURE 3, each laterally enlarged portion of the head 26 is provided therein with a cylindrical bore 53 spaced outwardly from the chamber 52 in the central portion of the head. The bore 53 is open at the rearward end of the head and terminates short of the forward end thereof, and the foreward end of the portion is provided with axial and lateral passages 54 establishing communication between the bore 53 and the chamber 52, the said lateral passage being closed at its outer end by means of a plug 55.

Mounted within the bore 53 is a valve assembly 56 comprising an annular valve seat 57 positioned coaxially in the forward end of the bore, a sleeve 58 threaded into the bore and retaining the seat therein, a needle valve 59 slidably guided by the sleeve 58 for movement toward and away from the valve seat 57, and packing gland means for the needle valve. The packing gland is preferably comprised of a packing 60 disposed in the forward end of a counterbore in the sleeve, a tubular stem 61 slidably mounted in said counterbore and forming a guide for the needle valve, and a cup nut 62 secured to the outer end of the stem and threadably engaged with the rearward end of the sleeve 58, the nut 62 having freedom for rotary movement and swivel movement relative to the stem 61 to facilitate assembly and guidance of the valve.

Adjacent its forward end, the needle mounting sleeve 58 is provided with a circumferential groove and lateral ports communicating with said groove, and a downwardly extending inlet port 63 is provided in the lateral portion of the head 26 to accommodate supply of components of the material to be sprayed to the interior of the sleeve rearwardly of the valve seat 57 and forwardly of the packing gland 60. A fitting 64 is threaded into the inlet bore 63 to accommodate connection of the respective one of the hoses 13 and 14. In view of the corrosive nature of the components being supplied thereto, the head 26, the seat 57, the sleeve 58 and the needle valve 59 are preferably formed of stainless steel.

As previously stated, both lateral enlargements of the head 26 are substantially identical and mount substantially identical valve assemblies 56. The two valves are intended to be actuated substantially simultaneously, and to facilitate such actuation, the needle 59 of each assembly is provided at its rearward end with a screw threaded portion for adjustable reception thereon of a spool nut 65, each of which is adapted to be locked in adjusted position on the respective needle by a lock nut 66. As will be appreciated, the spool nuts will be locked to the stem substantially in lateral alignment with one another. The nuts 65 are adapted for slidable reception thereon of slotted opposite end portions of a transversely extending yoke 67, which is provided centrally thereof with a rearwardly open recessed boss 68 adapted for reception of the forward end portion of the stem 41 of the yoke biasing assembly 39. Preferably, clearance is provided between the recess in the boss and the stem 41 to accommodate a limited degree of tilting of the yoke thereby to facilitate complete closing of both needle valves 59 under the urge of the yoke biasing spring 43; the degree of freedom being such however that both needle valves will be opened and closed with respect to their seats at substantially the same time.

The yoke 67 is preferably so adjusted by means of the spool nuts 65 relative to the needle valves 59 that the spring 43 will bias both needle valves to their seats before the air valve 34 reaches its seal when the trigger 24 is released to accommodate closing of the valves under the biasing force of the springs 36 and 43. Specifically, as shown in FIGURE 2, the boss 68 on the yoke 67 is normally spaced rearwardly of the trigger 24 in the closed position of all three of the valves 34, 59 and 59. Consequently, upon actuation of the trigger 24, the valve 34 is first opened to supply air under pressure to the rearward end portion of the central chamber 52 in the head 26, and shortly thereafter both needle valves 59 will be opened by actuation of the yoke 67 to supply the two components of the material to be sprayed to intermediate portions of the chamber 52.

Mounted within the chamber 52 in sealed relation to the walls thereof is a mixing nozzle 70 comprising one element of the nozzle assembly 28. The mixing nozzle 70 comprises a cylindrical body of a diameter equal substantially to that of the chamber 52 and of a length such that its rearward end is disposed rearwardly of the component supply passages 54 and forwardly of the bottom of the chamber 52. At its forward end, the nozzle 70 includes a radial flange adapted sealingly to abut the forward end face of the head 26, and a locating pin 71 is anchored in this flange for entry into a recess in the head 26 properly to align and locate the nozzle 70 in the chamber or bore 52. Within the forward end portion thereof, the nozzle 70 is provided with an axially located recess 72 of relatively small diameter and depth. Converging forwardly into this recess are four circumferentially spaced diagonal passages, namely; a diagonal passage 73 for each material component communicating with the respective supply passage 54 by way of a radial recess in the nozzle 70 aligned with the respective passages 54 and 73; and a pair of diagonal air passages 74 leading from the recess 72 to the rearward face of the nozzle 70 where they communicate directly with the chamber 52.

By virtue of the convergence of these four diagonal passages, and their termination closely adjacent one another in the recess 72, the two components of material to be sprayed are supplied in the form of diagonally intermingling streams, and these intermingling streams are simultaneously acted upon by intersecting jets of air under pressure thereby to produce, efficiently and effectively, thorough admixture of the two components.

The next succeeding element of the preferred embodiment of the nozzle assembly 28 is an intermediate member 75 defining an elongate cylindrical mixing chamber 76 therein. For cooperation with the mixing chamber 76, the nozzle 70 includes a plurality of circumferentially spaced longitudinally extending supplemental air passages 77 which are separated from one another and the passages 73 and 74, the same extending longitudinally through the nozzle from the rearward end face to the forward end face thereof in circumscribing relation to the recess 72 and the convergent forward ends of the passages 73 and 74.

The intermediate member 75 is generally cylindrical and includes a radially outwardly projecting flange 78 at its rearward end adapted sealingly to abut the forward face of the nozzle 70 radially outwardly of the supplemental air passages 77, and also adapted for cooperation with a securing ring 79 having detachable threaded engagement with the head 26 for securing the member 75 and the nozzle 70 on the head. The cylindrical mixing chamber 76 throughout the major portion of its length is of a diameter less than the diameter of the circle defined by the array of the four supplemental air passages 77, and the chamber is flared or belled outwardly at its rearward end, as indicated at 80, for communication with the forward ends of the supplemental air passages 77. Consequently, air emitting from the forward ends of the supplemental air passages 77 is in part diverted diagonally across the rearward end portions of the mixing chamber 76 further to assist in admixing the two components of the material to be sprayed, and is in part directed generally longitudinally along the walls of the chamber 76 thereby to scour the walls and prevent accumulation or build-up therealong of the reactant mixture. In this manner, extremely thorough admixture of the components of the material to be sprayed is achieved very simply, economically and efficiently; and at the same time, the portions of the gun contacted by the mixed material are maintained clean for efficient operation of the gun.

The material to be sprayed is thus supplied to the forward end of the chamber 76 in a thoroughly admixed condition. To spray the completed mixture, the present invention provides a simple atomizing nozzle 81 which is suitably screw threaded into the forward end portion of the member 75. While substantially any form of atomizing and spray pattern forming nozzle may be employed as desired, we prefer nozzles of the simplified construction shown in FIGURES 5 and 6. The nozzle shown in FIGURE 5 consists simply of a cylindrical body having a cylindrical bore therethrough of relatively small diameter for causing the mixed material to be discharged in the form of a finely atomized circular spray. The nozzle shown in FIGURE 6 similarly comprises a cylindrical body having a cylindrical bore, with the exceptions that the forward end of the cylindrical bore has a tapered countersink 82 and the spray orifice is provided by a diametric V-shaped slot 83 intersecting the tapered countersink thereby to define a generally elliptical orifice, whereby the nozzle of FIGURE 6 will produce a finely atomized fan-shaped spray.

As with the remainder of the components of the gun subjected to the corrosive action of the components of the material to be sprayed, the nozzle 70, the chamber-defining member 75 and the spray nozzle 81 are preferably formed of stainless steel.

To facilitate assembly of the nozzle means 28, the securing ring 79 and the spray nozzle 81 are provided with conventional hex-heads, the member 75 is provided with diametrically opposed flatted surface portions facilitating engagement therewith of a wrench, and a knock-out pin 84 is slidably mounted in the stud portion 50 of the head 26 rearwardly of the mixing nozzle 70 to facilitate removal of the nozzle 70 from the head.

From the foregoing, it will be appreciated that the present invention provides the operator with a compact, well balanced lightweight gun that may readily be manipulated for spray application of a wide variety of plural component coating materials. The gun is characterized by an elongate single spray head and nozzle assembly whereby only a single spray is emitted from the gun so that the operator may readily observe the pattern of the spray and the performance characteristics of the gun. To operate the gun, the operator need merely squeeze the trigger 24, whereupon the air valve 34 is first opened to cause compressed air to flow at a relatively high rate through the gun and the nozzle thereof. Shortly thereafter, the trigger engages the boss 68 of the yoke 67, whereupon the needle valves 59 are opened substantially simultaneously to cause the two components of the coating material to be fed into and through the nozzle means. By virtue of the diagonal convergence of the passages 73 and 74 in the mixing nozzle 70, these components will be thoroughly admixed with one another, for passage to and reaction within the mixing chamber 76. Within the mixing chamber, the supplemental air discharged through the passages 77 will function to impart additional mixing forces to the material in the chamber 76 and will also serve to scour the walls of the chamber to prevent accumulation of material therein. Then, the completed mixture of ingredients or components will be discharged through the spray nozzle 81 for atomization into a finely divided spray of the desired pattern, there being only a single spray emanating from a single nozzle whereby the operator may observe the characteristics of the spray, the performance of the gun and the mode of manipulation of the gun to achieve the desired coating result.

To discontinue spraying, the operator need merely release the trigger 24, whereupon the spring 43 returns the trigger and the two needle valves 59 to the point where the needle valves engage their seats and cut off supply of the components of the coating material being sprayed. At this moment, the air valve 34 is still open so that there is a rush of air through the nozzle passages 74, the recess 72, the chamber 76 and the spray nozzle 81 thereby to afford an initial clearing of the mixed components from the nozzle assembly. At this time, the spring 36 will continue biasing the air valve 34 and the trigger 24 forwardly, until the air valve 34 engages its seat. With the air valve closed, the slot 37 therein will accommodate a slight amount of air flow, which in passing through the passages 74 will serve to scour the terminal ends of the component supply passages 73, and to maintain the recess 72, the chamber 76 and the spray nozzle 81 clear. By virtue of the air pressure thus maintained in the nozzle means, and the scouring action of the air relative to the component passages 73, the components will be retained in their respective passages and will not drip therefrom to mix in and clog the recess 72, the chamber 76, or the spray nozzle 81. Consequently, this small bleed of air maintains the gun operative when the valves are closed, and particularly during periods of momentary closure of the valves.

When the gun is to remain out of service for a longer period of time, such as during a rest period, lunch hour, or between shifts, it is desirable to thoroughly flush the gun of all mixed material. It is for this purpose that the solvent tank 17 is included in the apparatus depicted in FIGURE 1.

The solvent is contained within a pressure tank 17 the upper regions of which are supplied with compressed air from the supply of atomizing air for the spray gun.

Consequently, when the air valve 34 of the gun is open, atomizing air is supplied to the gun and is bled off the solvent so that the pressure tank at this time is not operable to supply solvent to the gun through the flexible hose 18. In other words, the solvent supply means is rendered inoperative during operation of the gun for the spray application of coating materials. When the air valve 34 is closed, pressure builds up in the lines 15 and 16, whereby a pressure head is created on the solvent in the tank to force the solvent upwardly through the hose 18.

To control the flow of solvent, we provide a control valve assembly 85, which is shown particularly in FIGURES 7 and 8. The valve 85 comprises a solid rectangular block 86 having a vertical throughport 87 therein, the opposite ends of the port being threaded for reception of conventional fittings. In spaced parallel relation to the port 87, the block 86 is provided with a second port 88 which dead-ends within the interior of the body. The port 88 in turn communicates with a horizontally disposed stepped bore 89 which has a relatively larger outer portion defining a valve chamber communicating with the throughport 87 and a relatively reduced portion establishing communication between said enlarged portion and the inner end of the port 88, said reduced portion at its juncture with said enlarged portion defining a valve seat. Mounted within the enlarged outer end portion of the bore 89 is a valve 90 comprised of a collar 91 threaded into the outer end of the bore, a valve stem 92 threaded through the collar, a valve member 93 mounted on the inner end of the stem and having a conical head for engagement with the valve seat defined within the bore 89, a packing 94 around the stem 92 and a spring 95 confined between the valve head and the packing for maintaining a sealing pressure on the packing. To facilitate manipulation of the valve, a thumb nut head 96 is secured to the outer end of the stem 92.

In use, the throughport 87 is connected at its upper end by means of a fitting 97 to the lower end of the air inlet passage 31 in the gun handle 21, whereby the control valve 85 is physically joined to and mounted on the gun; the throughport 87 is connected at its lower end by means of a fitting 98 to the air hose 16; and the port 88 is connected at its lower end by means of a fitting 99 to the solvent supply hose 18. With the air valve 34 of the gun closed, and air supplied under pressure to the upper regions of the solvent pressure tank 17, the operator need only open the valve 90 by a partial turn of the thumb nut 96 to admit solvent via the ports 88, 89 and 87 to the air inlet passage 31 of the gun, from which the solvent will flow through the bleed hole or slot 37 into the passage 30, the bore 45, the bore 49, the chamber 52, and air passages 74 and 77.

The supply of solvent, which is thus of a restricted flow by virtue of the bleed slot 37, will perform the same functions relative to the component supply passages 73, the recess 72, the mixing chamber 76 and the spray nozzle 81 as above described with respect to the bleed of air through the gun. The solvent will perform the particular functions of killing the reaction between the components of the coating material and will assist the air in flushing the recess 72, the mixing chamber 76 and the spray nozzle 81 of any mixed material. The operator may discontinue solvent flow by closing the valve 90, whereafter air will continue to bleed through the slot 37 in the air valve 34 and through the gun to dry the solvent remaining in the gun and particularly in the recess 72, the chamber 76 and the nozzle 81, whereby the gun is automatically conditioned for proper operation the next time the trigger 24 is squeezed by the operator.

From the foregoing, it will be apparent to those skilled in the art that we have provided an improved spray gun for the spray application of a wide variety of plural fluid component coating materials, including a broad range of foaming resins and a broad range of non-foaming resins.

The gun is of simplified compact construction, does not require a plurality of spray nozzles, does not require a mixer or a mixer motor, and accomplishes its purposes in a particularly expedient and efficient manner. The gun is particularly characterized by provision of a single spray nozzle and emission of a single spray of fully mixed material components. Means are provided for automatically clearing the gun when its operation is discontinued, and for effecting a solvent flush of the gun when its operation is to be discontinued for a significant period of time. We have chosen for representation herein a manually operated embodiment of the gun, but it will be apparent to those skilled in the art that the particular features of this invention are equally adapted to automatic guns. Accordingly, all of the objects and advantages of the invention have been shown herein to be attained in a convenient, practical and economical manner.

While we have shown and described what we regard to be the preferred embodiment of our invention, it will be appreciated that various changes, rearrangements and modifications may be made therein without departing from the scope of the invention, as defined by the appended claims.

We claim:

1. A mixing nozzle for plural component spray guns comprising a body having a plurality of passages therein separated throughout their lengths, said passages extending diagonally from the inlet end of said body to the discharge end thereof in mutually convergent relation and communicating with said discharge end of said body in closely adjacent relation to one another, said passages including a separate individual passage for each component and air under pressure, and a plurality of supplemental air passages in said body spaced circumferentially from one another and the first-named passages and opening at said discharge end of said body in circumscribing relation to the convergent ends of said first-named passages.

2. A mixer assembly for the spraying of plural fluid component coating materials and the like comprising a mixing nozzle having a recess in the discharge end thereof, a plurality of mutually convergent separated diagonal passages terminating in said recess, said passages comprising a separate individual passage for each of the components and air under pressure, and a plurality of circumferentially spaced supplemental air passages separated from said convergent passages and disposed in a circular circumscribing array about said recess; an intermediate member having an elongate mixing chamber communicating at one end coaxially with said recess, the major portion of said chamber having a cross-sectional area approximately equal to the cross-sectional area of said recess and transverse dimensions significantly less than the diameter of the array circle of said supplemental air passages, said chamber being sharply flared outwardly at said one end for communication with said supplemental air passages; and a nozzle communicating coaxially with the opposite end of said chamber.

3. In means for spraying plural fluid component coating materials, a mixing nozzle having separated passages therein for independent flow of each component and air under pressure, said passages terminating closely adjacent one another in a mixing chamber, selectively operable supply means for the components connected to the respective passages, supply means for air under pressure connected to the respective passage, valve means in the last-named supply means for selectively supplying air in significant volume to said passage, and by-pass means around said valve means accommodating continuous but restricted flow of air under pressure through the air passage into said mixing chamber for clearing all but the independent component passages when said component supply means are inoperative.

4. In means for spraying plural fluid component coating materials, a mixing nozzle having separated passages therein for independent flow of each component and air under pressure, said passages terminating closely adjacent one another in a mixing chamber, selectively operable supply means for the components connected to the respective passages, and selectively operable solvent supply means connected to said air passage for selectively supplying solvent via said air passage to said mixing chamber.

5. In means for spraying plural fluid component coating materials, a mixing nozzle having separated passages therein for independent flow of each component and air under pressure, said passages terminating closely adjacent one another in a mixing chamber, selectively operable supply means for the components connected to the respective passages, supply means for air under pressure connected to the respective passage, valve means in the last-named supply means for selectively supplying air in significant volume to said passage, by-pass means around said valve means accommodating continuous but restricted flow of air under pressure through the air passage into said mixing chamber, and selectively operable solvent supply means connected to said air supply means for selectively supplying solvent via said by-pass means and said air passage to said mixing chamber, the continuous flow of air and the supply of solvent serving to clear all but the independent component passages when said component supply means are inoperative.

6. A spray gun for plural fluid component coating materials and the like comprising a gun body having air passages therethrough and a valve in said body controlling said passages; a laterally enlarged spray head coupled to said body and having centrally located air passages communicating with the air passages in said body, said head in the laterally enlarged portions thereof having passages for a plurality of different coating material components and a valve in the passages for each component; trigger means coupled to all of said valves for opening and closing the same generally conjointly; a mixing nozzle in said head having a rearward end portion communicating with said air passages, a wall portion adjacent said component passages and a forward end portion having a recess therein, said nozzle having therein an independent diagonal passage for each component extending from said recess to said wall portion and communicating with the respective component passage and at least one independent diagonal passage extending from said recess to said rearward end portion, said independent passage mutually converging into said recess, and a plurality of longitudinal passages extending from said rearward end portion to said forward end portion in circumscribing relation to said recess; an intermediate nozzle member having a mixing chamber communicating at one end coaxially with said recess, the major portion of said chamber having a transverse dimension, approximately equal to the transverse dimension of said recess and significantly less than the diametrical spacing of said longitudinal passages, said chamber being sharply flared outwardly at said one end for communication with said longitudinal passages; and a nozzle communicating coaxially with the opposite end of said chamber.

7. A spray gun as set forth in claim 6, including bleed means by-passing the air valve in the closed position thereof for accommodating a continuous flow of air to said recess, said mixing chamber and said nozzle.

8. A spray gun as set forth in claim 6, including manually controlled means for supplying solvent to said air passages and thus to said recess, said mixing chamber and said nozzle.

9. A spray gun as set forth in claim 6, wherein said trigger means includes yoke biasing means, a yoke rockably mounted on said biasing means and adjustably connected to the component valves, and a trigger normally engaging the air valve and operatively engageable with said yoke.

10. A spray gun for plural fluid component coating materials and the like comprising a gun body, a trigger mounted on said body, a laterally enlarged spray head coupled to said body and having fluid component passages therein to opposite sides of said body, a valve in each passage for controlling flow therethrough, a common yoke for actuating said valves, and yoke biasing means on said gun body biased toward said trigger, said yoke bridging between said valves, extending between said biasing means and said trigger, being rockably mounted on said biasing means between the trigger and said biasing means and being adjustably connected to each of said valves.

11. In means for spraying plural fluid component coating materials, a nozzle having separated passages for independent flow of components and air under pressure, selectively operable respective supply means connected to the respective passages, and selectively operable solvent supply means connected to said air passage.

12. In means for spraying plural fluid component coating materials, a nozzle having separated passages for independent flow of components and air under pressure, selectively operable respective supply means connected to the respective passages, valve means in the air supply means for selectively supplying air in significant volume to the air passage, bleed means around said valve means accommodating continuous but restricted flow of air through said air passage, and solvent supply means connected to said air supply means.

References Cited by the Examiner

UNITED STATES PATENTS

| | | | |
|---|---|---|---|
| 2,878,063 | 3/59 | Kish et al. | |
| 2,971,700 | 2/61 | Peeps. | |
| 2,992,194 | 7/61 | Paulsen | 239—428 |
| 3,010,658 | 11/61 | Rutter | 239—424 |
| 3,027,096 | 3/62 | Giordano | 239—414 |
| 3,033,472 | 5/62 | Shelton | 239—428 |
| 3,042,096 | 7/62 | Edwards et al. | |
| 3,057,273 | 10/62 | Wilson | 239—112 |
| 3,146,950 | 9/64 | Lancaster | 239—415 |

EVERETT W. KIRBY, *Primary Examiner.*

EDWARD J. MICHAEL, LOUIS J. DEMBO,
*Examiners.*